(12) United States Patent
Miyagi et al.

(10) Patent No.: US 8,901,453 B2
(45) Date of Patent: Dec. 2, 2014

(54) LASER PROCESSING SYSTEM AND OVERLAY WELDING METHOD

(75) Inventors: Masanori Miyagi, Hitachinaka (JP);
Takeshi Tsukamoto, Mito (JP);
Hirotsugu Kawanaka, Mito (JP)

(73) Assignee: Hitachi, Ltd., Tokyo (JP)

( * ) Notice: Subject to any disclaimer, the term of this patent is extended or adjusted under 35 U.S.C. 154(b) by 401 days.

(21) Appl. No.: 13/316,984

(22) Filed: Dec. 12, 2011

(65) Prior Publication Data

US 2012/0145683 A1    Jun. 14, 2012

(30) Foreign Application Priority Data

Dec. 13, 2010    (JP) .................................. 2010-276655

(51) Int. Cl.
B23K 26/34    (2014.01)
B23K 26/14    (2014.01)
B23K 26/08    (2014.01)

(52) U.S. Cl.
CPC .............. *B23K 26/1411* (2013.01); *B23K 26/34* (2013.01); *B23K 26/08* (2013.01); *B23K 26/14* (2013.01); *B23K 26/147* (2013.01); *B23K 26/345* (2013.01)
USPC .............. 219/121.63; 219/121.64; 219/121.84

(58) Field of Classification Search
CPC .................. B23K 26/14; B23K 26/34; B23K 26/00–26/70; B22F 7/00; B22F 2003/00; B22D 11/108
USPC ............................ 219/121.63–121.66, 121.84
See application file for complete search history.

(56) References Cited

U.S. PATENT DOCUMENTS

| | | | | |
|---|---|---|---|---|
| 5,304,771 | A | * | 4/1994 | Griffin et al. ............ 219/121.63 |
| 5,837,960 | A | * | 11/1998 | Lewis et al. ............. 219/121.63 |
| 5,961,862 | A | | 10/1999 | Lewis |
| 6,534,745 | B1 | * | 3/2003 | Lowney .................. 219/121.84 |

(Continued)

FOREIGN PATENT DOCUMENTS

| | | |
|---|---|---|
| CN | 201 136 896 | 10/2008 |
| CN | 201 144 284 | 11/2008 |

(Continued)

OTHER PUBLICATIONS

EP Search Report of Appln. No. 11193372.7 dated Apr. 5, 2012 in English.

(Continued)

*Primary Examiner* — Samuel M Heinrich
(74) *Attorney, Agent, or Firm* — Antonelli, Terry, Stout & Kraus, LLP.

(57) ABSTRACT

A laser processing system includes a laser processing head, a powder supply device, and a controller. The powder supply device supplies powder to the laser processing head. The laser processing head includes: a laser emission unit which irradiates a workpiece with laser light; and a powder supply unit which receives the powder supplied from a powder supply device to the laser processing head, and can supply the powder to a laser spot on the workpiece. The powder supply unit includes: a powder discharge unit which can discharge the powder toward the laser spot on the workpiece; and a powder-supply control mechanism which controls the amount of the powder to be supplied to the powder discharge unit, by distributing to the powder discharge unit at least a part of a flow of the powder supplied from the powder supply device. The controller controls the distributing by the powder-supply control mechanism.

13 Claims, 7 Drawing Sheets

(56) References Cited

U.S. PATENT DOCUMENTS

| | | | |
|---|---|---|---|
| 6,940,037 B1* | 9/2005 | Kovacevic et al. | 219/121.64 |
| 8,735,769 B2* | 5/2014 | Miyagi et al. | 219/121.64 |
| 2005/0288813 A1* | 12/2005 | Yang et al. | 700/119 |

FOREIGN PATENT DOCUMENTS

| | | |
|---|---|---|
| EP | 2 314 411 | 4/2011 |
| JP | 63-112087 | 5/1988 |
| JP | 01-118350 | 5/1989 |
| JP | 11-33757 | 2/1999 |
| JP | 11-156554 | 6/1999 |
| JP | 2004-306088 | 11/2004 |
| JP | 2007-301980 | 11/2007 |
| JP | 2011-88154 | 5/2011 |

OTHER PUBLICATIONS

JP office action of Appln. No. 2010-276655 dated Jan. 21, 2014.

* cited by examiner

Distribution Ratio
10:0

FIG.2C

Distribution Ratio
7:3

FIG.2D

Distribution Ratio
3:7

FIG.2E

Distribution Ratio
0

LASER PROCESSING SYSTEM AND OVERLAY WELDING METHOD

CROSS-REFERENCE TO RELATED APPLICATIONS

This application claims the foreign priority benefit under 35 U.S.C. §119 of Japanese Patent Application No. 2010-276655, filed on Dec. 13, 2010, the disclosure of which is incorporated herein by reference.

BACKGROUND OF THE INVENTION

1. Field of the Invention

The present invention relates to a laser processing system using powder as filler material and being able to be used for laser overlay welding. The present invention also relates to an overlay welding method using the laser processing system.

2. Description of the Related Art

In recent years, the laser weld overlay using powder as filler material has been used for direct forming by near net-shape production, surface processing for giving a function of wear resistance or the like, and other purposes. The laser overlay welding needs precise control of the powder supply rate during processing in order to control the shape of the weld overlay and the chemical composition of the weld overlay in the case where multiple types of powders are used as filler materials.

However, since the powder supply rate is controlled by a powder supply device, the power transportation causes a time lag, so that it is difficult to precisely control the powder supply rate during processing. In addition, because of the time lag, the powder which is not used in welding is uselessly supplied to the region under the processing before and after the welding, so that the useless consumption of the powder lowers the yield.

In a technique which has been proposed for overcoming the above problem, the powder supply rate during processing is controlled by arranging, in a powder supply nozzle, a mechanism for controlling the powder supply rate. For example, Japanese Patent Laid-open No. 11-033757 discloses a powder supply device in which the rate of supply of powder from a powder supply nozzle is monitored and the powder supply rate is controlled by driving a nozzle pin upward or downward according to the monitored rate.

The above powder supply device supplies the powder from one side of the laser beam to the region under processing by making the powder drop from the nozzle by gravity. The powder supply device is constituted by a sensor which detects the flow rate of the powder discharged from the nozzle, a nozzle pin which controls the flow rate of the powder by being driven upward or downward in the nozzle, and a sensor which detects the position of the nozzle pin.

Nevertheless, the powder supply device having a construction as disclosed in Japanese Patent Laid-open No. 11-033757 cannot achieve a stable powder supply rate when the direction of the processing changes. In such a powder supply device, the structure of controlling the rate of fall of the powder with the nozzle pin can make the powder transiently pile up in the powder supply nozzle.

That is, the laser overlay techniques using the conventional powder supply device as described above has difficulty in quickly controlling the rate of supply of the powder to the region under processing, and is therefore unable to achieve a stable powder supply rate.

The present invention has been developed in view of the above circumstances. A first object of the present invention is to provide a laser processing system enabling quick control of the powder supply rate and achievement of powder supply rates which are more stable than the powder supply rates achieved in the laser overlay techniques using the conventional powder supply device. A second object of the present invention is to provide an overlay welding method using the above laser processing system achieving the first object.

SUMMARY OF THE INVENTION

In order to accomplish the first object, the first aspect of the present invention provides a laser processing system which includes a laser processing head, a powder supply device, and a controller. The powder supply device supplies powder to the laser processing head. The laser processing head includes: a laser emission unit which irradiates a workpiece with laser light; and a powder supply unit which receives the powder supplied from a powder supply device to the laser processing head, and can supply the powder to a laser spot on the workpiece. The powder supply unit includes: a powder discharge unit which can discharge the powder toward the laser spot on the workpiece; and a powder-supply control mechanism which controls the amount of the powder to be supplied to the powder discharge unit, by distributing to the powder discharge unit at least a part of a flow of the powder supplied from the powder supply device. The controller controls the distributing by the powder-supply control mechanism.

In order to accomplish the first object, the second aspect of the present invention provides a laser processing system which includes a laser processing head, a powder supply device, and a controller. The powder supply device supplies a plurality of types of powders to the laser processing head. The laser processing head includes: a laser emission unit which irradiates a workpiece with laser light; and a powder supply unit which receives the plurality of types of powders respectively supplied from a plurality of powder supply devices to the laser processing head, and can supply the plurality of types of powders to a laser spot on the workpiece. The powder supply unit includes: a powder discharge unit which can discharge the plurality of types of powders toward the laser spot on the workpiece; and a plurality of powder-supply control mechanisms which respectively control the amounts of the plurality of types of powers to the powder discharge unit, by distributing to the powder discharge unit at least a part of a flow of each of the plurality of types of powders supplied from the plurality of powder supply devices. The controller controls the distributing by the plurality of powder-supply control mechanisms.

In order to accomplish the second object, the third aspect of the present invention provides an overlay welding method executed in a laser processing system including a laser processing head and a powder supply device which supplies powder to the laser processing head, where the laser processing head includes a laser emission unit which irradiates a workpiece with laser light and a powder discharge unit which can discharge the powder to a laser spot on the workpiece. The overlay welding method includes the steps of: supplying, by the powder supply device, the powder to a powder-supply control mechanism arranged in the laser processing head; controlling, by the powder-supply control mechanism, the amount of the powder to be supplied to the powder discharge unit by distributing to the powder discharge unit at least a part of a flow of the powder supplied from the powder supply device; and discharging, by the powder discharge unit, the powder the amount of which is controlled by the powder-supply control mechanism, to the laser spot on the workpiece.

In order to accomplish the second object, the fourth aspect of the present invention provides an overlay welding method executed in a laser processing system including a laser processing head and a powder supply device which supplies powder to the laser processing head, where the laser processing head includes a laser emission unit which irradiates a workpiece with laser light and a powder discharge unit which can discharge the powder to a laser spot on the workpiece. The overlay welding method includes the steps of: supplying the plurality of types of powders from the plurality of powder supply devices to a plurality of powder-supply control mechanisms arranged in the laser processing head, respectively; controlling, by the plurality of powder-supply control mechanisms, the amounts of the plurality of types of powders to be supplied to the powder discharge unit, by distributing to the powder discharge unit at least a part of a flow of each of the plurality of types of powders supplied from the plurality of powder supply devices, respectively; and discharging, by the powder discharge unit, the plurality of types of powders the amounts of which are controlled by the plurality of powder-supply control mechanisms, to the laser spot on the workpiece.

DETAILED DESCRIPTION OF THE PREFERRED EMBODIMENT

In the laser processing system and the overlay welding method according to the present invention, powder as filler material is supplied from a powder supply device to a laser spot on a workpiece through a powder discharge unit such as a nozzle. As described before, the laser processing system and the overlay welding method according to the present invention are characterized in that the flow of the powder supplied from the powder supply device is split for distribution to the powder discharge unit in the laser processing head. Hereinbelow, the first to third embodiments of the present invention are explained with reference to FIGS. 1 to 7.

1. First Embodiment

The first embodiment of the present invention is explained below with reference to FIGS. 1 to 4.

1.1 Laser Processing System

Figure 1:
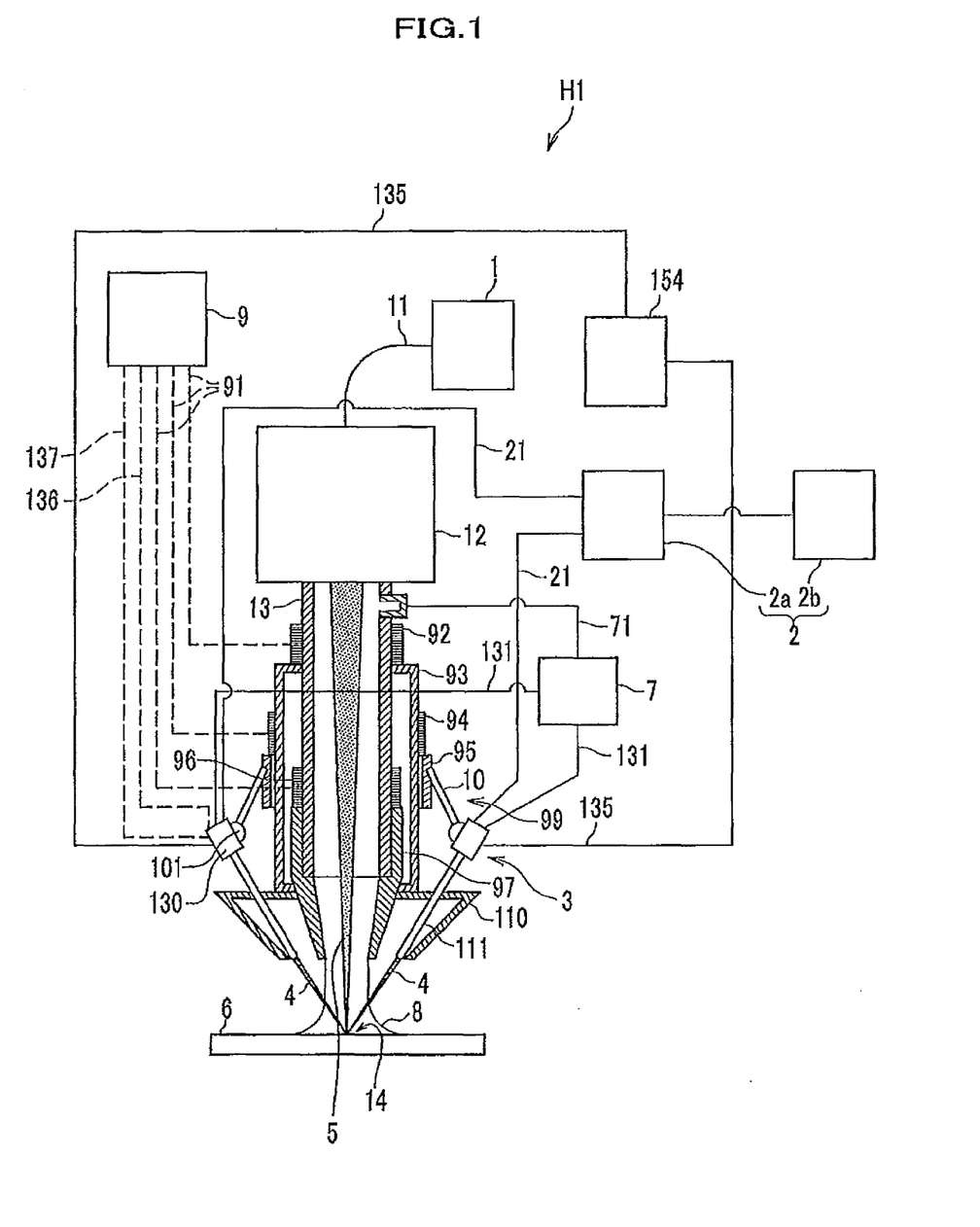
FIG. 1 is a diagram illustrating a laser processing system according to a first embodiment of the present invention.

FIG. 1 illustrates the laser processing system according to the first embodiment of the present invention. The laser processing system of FIG. 1 includes a laser processing head constituted by a laser emission unit 13 and a powder supply unit 3. In addition, a laser oscillator 1, a powder supply device 2, a gas source 7, a controller 9, a laser condensing unit 12, and a powder recovery container 154. Further, in FIG. 1, a flow of powder (powder flow) is indicated by the reference 4, a workpiece is indicated by the reference 6, laser light is indicated by the reference 5, a laser spot on the workpiece 6 is indicated by the reference 14, and a shield-gas flow is indicated by the reference 8.

The laser emission unit 13 irradiates the workpiece 6 with the laser light 5. The powder supply unit 3 supplies the powder to the laser spot 14, where the powder is supplied from the powder supply device 2 to the powder supply unit 3, and the laser spot 14 on the workpiece 6 is irradiated by laser light 5.

The powder supply unit 3 is constituted by powder supply nozzles 111 and powder-supply control mechanisms 130, which are explained later in detail. The powder supply nozzles 111 correspond to the aforementioned powder discharge unit.

The laser light 5 is generated by the laser oscillator 1, transmitted through an optical fiber 11 to the laser condensing unit 12, condensed by the laser condensing unit 12, and emitted from the laser emission unit 13 onto the laser spot 14 on the workpiece 6.

The powder supply device 2 is constituted by a main part 2a and a carrier-gas source 2b. The main part 2a contains the powder. The powder supply device 2 supplies a powder flow to each of the powder-supply control mechanisms 130 through one of powder supply channels 21, where the powder is accompanied by carrier gas.

Each of the powder-supply control mechanisms 130 distributes at least a part of the powder flow to the powder supply nozzles 111. Each of the powder supply nozzles 111 discharges the distributed part of the powder flow toward the laser spot 14 on the workpiece 6.

The powder supply nozzles 111 are respectively formed with tubular bodies. The tubular bodies have upper ends connected to the powder-supply control mechanisms 130, respectively. The tubular bodies extend in the inclined directions from the upper ends toward the laser spot 14, respectively. The lower ends of the powder supply nozzles 111 are supported by a holder 110, which is arranged near the tip of the laser emission unit 13 in such a manner that the powder supply nozzles 111 are inclined at an identical angle from the optical axis of the laser light. Thus, the powder flows 4 discharged from the powder supply nozzles 111 are supplied to the laser spot 14 in such a manner that the powder flows 4 join together on the optical axis of the laser light.

The number of the powder supply nozzles 111 may be any number greater than one. The inner diameters of the powder supply nozzles 111 are not specifically limited. The powder supply nozzles 111 may be arranged, for example, at the positions of generatrix lines on a circular cone having as the axis the optical axis of the laser light. Alternatively, the powder supply nozzles 111 may be arranged in random positions.

Shield gas is supplied from the gas source 7 to the upper part of the laser emission unit 13 through a gas-supply tube 71. The shield gas is inert gas (in a broad sense) such as helium gas or nitrogen gas. The shield gas supplied to the laser emission unit 13 is then discharged from a shield-gas nozzle 97 (which is arranged in the lower part of the laser emission unit 13), and forms a shield-gas flow 8. The supply of the shield-gas flow 8 onto the workpiece 6 suppresses oxidation of the overlay weld.

In addition, the gas source 7 supplies the inert gas as supplemental gas to branches 134a and 135a (illustrated in FIGS. 2A, 2B, and 2C) as explained later. The gas source 7 constitutes the supplemental-gas supply mechanism described in the appended claims.

The shield-gas nozzle 97 has a positioning mechanism 96, which moves the shield-gas nozzle 97 in the vertical direction. The positioning mechanism 96 can be realized, for example, by using an electric actuator or the like. The (standoff) distance between the surface of the workpiece 6 and the tip of the shield-gas nozzle 97 (i.e., the (standoff) height of the shield-gas nozzle 97) can be set by adjusting the vertical position of the tip of the shield-gas nozzle 97 by the positioning mechanism 96. The operations of the positioning mechanism 96 are controlled by the controller 9 through signal lines 91. That is, the controller 9 controls the vertical position of the shield-gas nozzle 97.

A vertically movable part 93 is arranged around the outer surface of the laser emission unit 13. The vertically movable part 93 can be vertically moved by a positioning mechanism 92. The positioning mechanism 92 is arranged on the upper part of the vertically movable part 93, and can be realized, for example, by using an electric actuator or the like. The holder 110 is fixed to the bottom end of the vertically movable part 93. Therefore, when the vertically movable part 93 is vertically moved by the positioning mechanism 92, the powder supply nozzles 111 (supported by the holder 110) and the powder-supply control mechanisms 130 (arranged at the upper ends of the powder supply nozzles 111) vertically move together with the holder 110. Thus, the height of the bottom ends of the powder supply nozzles 111 can be varied, so that the position at which the powder is concentrated can be controlled. The operations of the positioning mechanism 92 are controlled by the controller 9 through the signal lines 91.

Further, an angle adjustment unit 99 is arranged around the outer surface of the vertically movable part 93 for adjustment of the angles of the powder supply nozzles 111. The angle adjustment unit 99 is constituted by a vertically movable part 95, a positioning mechanism 94, arms 10, and intermediate members 101. The positioning mechanism 94 vertically moves the vertically movable part 95, and can be realized, for example, by using an electric actuator. The upper ends of the arms 10 are pivotally supported by the vertically movable part 95, and the lower ends of the arms 10 are pivotally supported by the intermediate members 101, respectively. The intermediate members 101 are respectively attached to the powder-supply control mechanisms 130.

Since the intermediate members 101 (being attached to the powder-supply control mechanisms 130 and pivotally supporting the lower ends of the arms 10) allow variation of the angle between each of the arms 10 and the corresponding one of the powder supply nozzles 111 (the bottom ends of which are supported by the holder 110), the angle between each of the arms 10 and the corresponding one of the powder supply nozzles 111 can be changed when the positioning mechanism 94 vertically moves the vertically movable part 95 and the arms 10. Therefore, the angle of the powder flow 4 discharged from each of the powder supply nozzles 111 can be controlled by the vertical movement of the vertically movable part 95 realized by the positioning mechanism 94. The operations of the positioning mechanism 94 are controlled by the controller 9 through the signal lines 91.

1.2 Powder-Supply Control Mechanisms

The powder-supply control mechanisms 130 are explained below with reference to FIGS. 2A, 2B, 2C, 2D, and 2E.

Figure 2A:
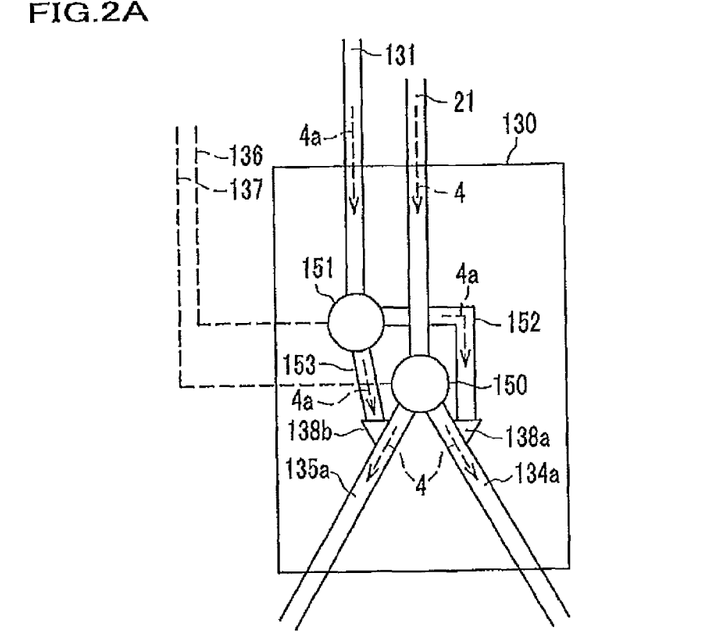
FIG. 2A is a schematic diagram illustrating a construction of a powder-supply control mechanism constituting the laser processing head illustrated in FIG. 1.

FIG. 2A schematically illustrates a construction of each powder-supply control mechanism constituting the laser processing system illustrated in FIG. 1. As illustrated in FIG. 2A, the main constituents of the powder-supply control mechanism are the branches 134a and 135a, a branch valve 150, branches 152 and 153, a branch valve 151, and a shutoff valve 155. The gas source 7 is connected to each powder-supply control mechanism 130 through one of the supplemental-gas supply channels 131, and the powder supply device 2 is connected to each powder-supply control mechanism 130 through one of the powder supply channels 21. Further, each powder-supply control mechanism 130 is connected to one of the return pipe arrangements 135 (which is illustrated in FIG. 1).

As mentioned before, each powder-supply control mechanism 130 distributes to one of the powder discharge units (powder supply nozzles) 111 at least a part of the powder flow 4 supplied from the powder supply device 2 through one of the powder supply channels 21. Specifically, each powder-supply control mechanism 130 splits the powder flow supplied from the powder supply device 2, into first and second parts in such a manner that the first part of the powder flow 4 is distributed to the corresponding one of the powder supply nozzles 111 and discharged from the corresponding one of the powder supply nozzles 111 toward the laser spot 14 on the workpiece 6, and the second part of the powder flow 4 is returned to the powder recovery container 154 through the corresponding one of the return pipe arrangements 135.

In addition, each powder-supply control mechanism 130 receives a flow 4a of the supplemental gas (a supplemental-gas flow 4a) from the gas source 7 through one of the supplemental-gas supply channels 131, and makes the supplemental-gas flow 4a join the first and/or second parts of the powder flow 4. Therefore, when the first part of the powder flow 4 is discharged from one of the powder supply nozzles 111 or when the second part of the powder flow 4 is returned to the powder recovery container 154, the powder is accompanied by both of the carrier gas supplied from the carrier-gas source 2b and the supplemental gas supplied from the gas source 7.

Details of the operations of each powder-supply control mechanism 130 are as follows.

As illustrated in FIG. 2A, the powder flow supplied through one of the powder supply channels 21 is introduced into each powder-supply control mechanism 130 and split (at a position on the downstream side of the powder supply channel 21) into the branches 134a and 135a. The branch 134a is connected to one of the powder supply nozzles 111, and corresponds to the supply pipe arrangement described in the appended claims. The branch 135a is connected to one of the return pipe arrangements 135 (illustrated in FIG. 1).

As illustrated in FIG. 2A, the branch valve 150 is arranged at the branch point at which the powder flow 4 supplied through the powder supply channel 21 is split into the branches 134a and 135a. The branch valve 150 corresponds to the distribution-ratio control mechanism described in the appended claims. The branch valve 150 is constituted by a valve element 150a and an electric rotary actuator 150b. The valve element 150a adjusts the opening degrees of the branches 134a and 135a, and the electric rotary actuator 150b drives the valve element 150a. The operations of the electric rotary actuator 150b are controlled by the controller 9 through a signal line 137 (illustrated in FIG. 1).

Figure 2B:
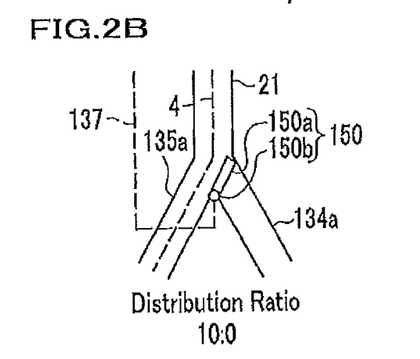
FIGS. 2B and 2C are schematic diagrams illustrating functions for distributing a powder flow in the powder-supply control mechanism.

FIG. 2B schematically illustrates a state of the branch valve 150 in the powder-supply control mechanism. In each powder-supply control mechanism 130, when the distribution ratio between the branches 135a and 134a is 10:0 (i.e., when the branch 134a is completely closed) as illustrated in FIG. 2B, no powder is supplied to the powder supply nozzles 111 (illustrated in FIG. 1), and the powder is all returned to the powder recovery container 154 (illustrated in FIG. 1). The distribution ratio between the branches 135a and 134a is the ratio between the opening degree of the branch 135a and the opening degree of the branch 134a.

Figure 2C:
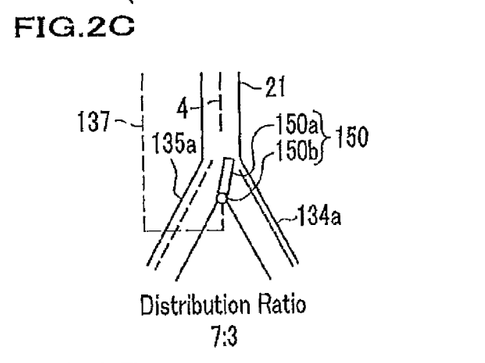

FIG. 2C schematically illustrates another state of the branch valve 150 in the powder-supply control mechanism. In each powder-supply control mechanisms 130, when the distribution ratio between the branches 135a and 134a is 7:3 (i.e., when the branch 134a is completely closed) as illustrated in FIG. 2C, 70% of the powder flow 4 is supplied to the powder supply nozzles 111 (illustrated in FIG. 1), and 30% of the powder flow 4 is returned to the powder recovery container 154 (illustrated in FIG. 1).

In addition, as illustrated in FIG. 2A, the supplemental-gas flow 4a supplied through one of the supplemental-gas supply channels 131 is introduced into each powder-supply control mechanism 130 and split (at a position on the downstream side of the supplemental-gas supply channel 131) into the branches 152 and 153. The branch 152 is connected to a supplemental-gas inlet 138a, which is arranged on the branch 134a for the first part of the powder flow 4. The branch 153 is connected to a supplemental-gas inlet 138b, which is arranged on the branch 135a for the second part of the powder flow 4.

Figure 2D:
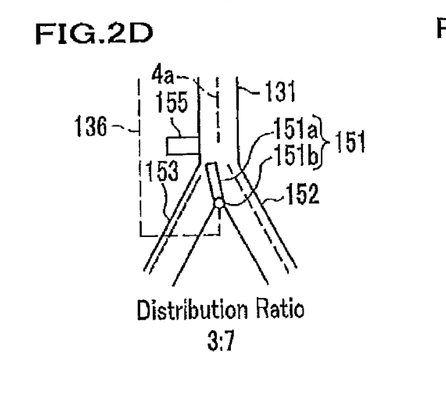
FIGS. 2D and 2E are schematic diagrams illustrating functions for distributing supplemental gas in the powder-supply control mechanism.
Figure 2E:
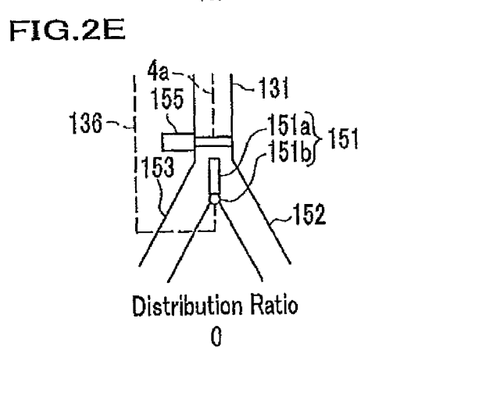

FIGS. 2D and 2E schematically illustrate functions for distributing the supplemental gas in the powder-supply control mechanism. As illustrated in FIGS. 2D and 2E, the branch valve 151 and the shutoff valve 155 are arranged at the branch point at which the supplemental-gas flow 4a supplied through the supplemental-gas supply channel 131 is split into the branches 152 and 153. The branch valve 151 is constituted by a valve element 151a and an electric rotary actuator 151b. The valve element 151a adjusts the opening degrees of the branches 152 and 153, and the electric rotary actuator 151b drives the valve element 151a. The operations of the electric rotary actuator 151b are controlled by the controller 9 through a signal line 136 (illustrated in FIG. 1).

In the powder-supply control mechanisms 130 having the above construction, the supplemental gas is supplied to the branches 152 and 153 in a predetermined distribution ratio. After the flow of the supplemental gas joins the powder flow in one or each of the branches 134a and 135a, the supplemental gas behaves as carrier gas accompanying the powder.

The ratio between the openings of the branches 152 and 153 (as illustrated in FIGS. 2D and 2E) is controlled in the branch valve 151 according to the distribution ratio between the openings of the branches 134a and 135a (as illustrated in FIGS. 2B and 2C) in the branch valve 150, so that the flow rate of the carrier gas in each of the branches 134a and 135a can remain unchanged even after the distribution ratio between the branches 134a and 135a is changed.

For example, when the distribution ratio between the openings of the branches 134a and 135a in the branch valve 150 is 7:3 as illustrated in FIG. 2C, the branch valve 151 is controlled so as to make the ratio between the openings of the branches 152 and 153 equal to 3:7. In this case, it is possible to compensate for the shortage of the carrier gas caused by the splitting by the branch valve 150, with the supplemental gas. Thus, even after the splitting, the powder can be transported in each of the branches 134a and 135a with the same flow rate of the carrier gas as in the powder supply channels 21.

Further, the shutoff valve 155 is arranged for closing the supplemental-gas supply channel 131 as illustrated in FIG. 2E and preventing the supplemental gas from joining the powder flow in either of the branches 134a and 135a. The supplemental-gas supply channel 131 is closed when one of the branches 134a and 135a is completely closed by the branch valve 150.

In the above explanations, it is assumed that the rate of the supplemental gas supplied to each powder-supply control mechanism 130 through the supplemental-gas supply channel 131 is identical to the rate of the carrier gas supplied to the powder-supply control mechanism 130 through the powder supply channel 21. However, the rate of the supplemental gas supplied to each powder-supply control mechanism 130 through the supplemental-gas supply channel 131 may be different from the rate of the carrier gas supplied to the powder-supply control mechanism 130 through the powder supply channel 21. Although the flow rate of the supplemental gas supplied to each of the branches 134a and 135a is controlled by the ratio of the valve openings in the branch valve 151, alternatively, the flow rate of the supplemental gas supplied to each of the branches 134a and 135a may be independently controlled without use of the branch valve 151.

1.3 Operations

Next, the operations and advantages of the laser processing system according to the first embodiment are explained below.

1.3.1 Configuration for Overlay Welding

Figure 3:
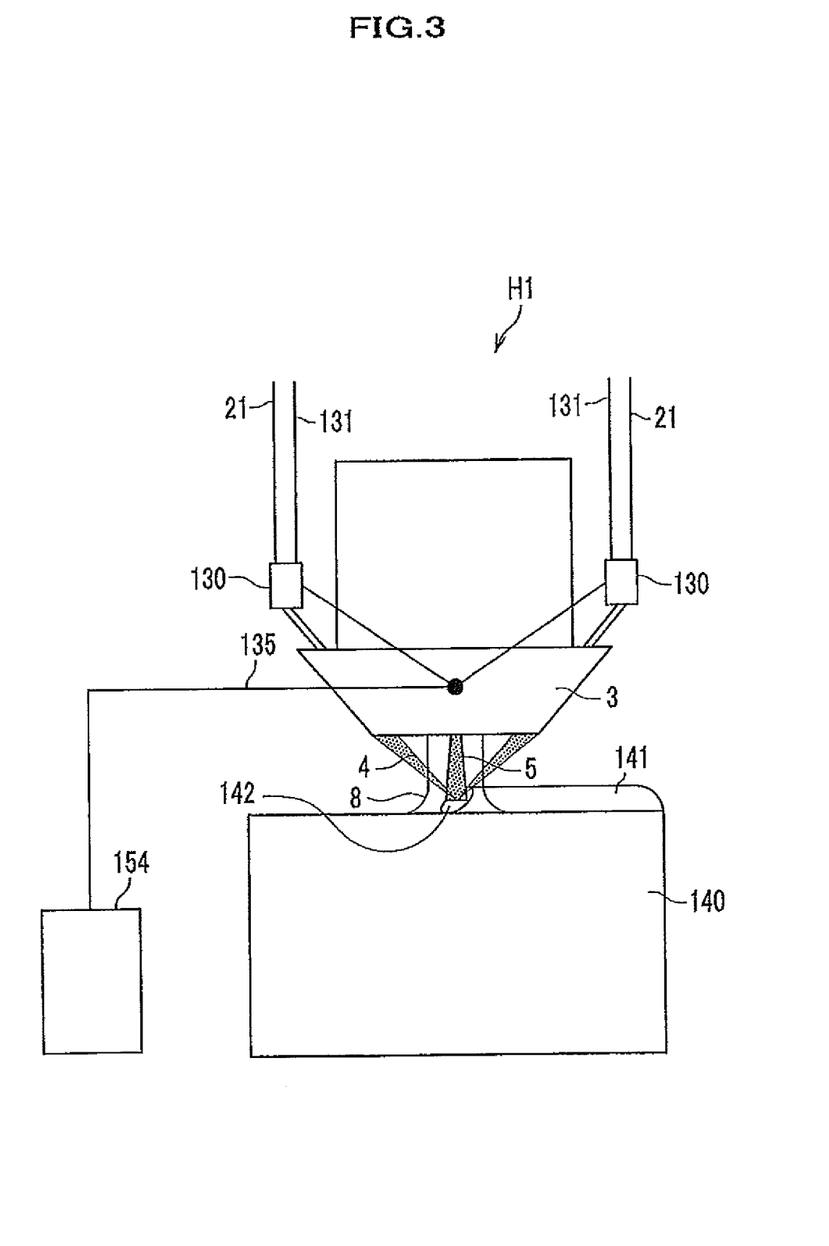
FIG. 3 is a diagram schematically illustrating an example of a configuration for overlay welding by use of the laser processing system illustrated in FIG. 1.

FIG. 3 schematically illustrates an example of a configuration for overlay welding by use of the laser processing system illustrated in FIG. 1. In the example of FIG. 3, the laser processing system according to the present embodiment is used in overlay welding on an upper edge of a turbine blade 140 as a workpiece. In FIG. 3, the same elements as FIG. 1 respectively bear the same reference numbers.

As illustrated in FIG. 3, an overlay weld 141 is formed by supplying a powder flow 4 from the powder supply unit 3 to a molten pool 142 (which is produced by irradiation with the laser light 5). The molten pool 142 moves from the right to the left in FIG. 3. Oxidation of the overlay weld 141 is suppressed by blowing the shield-gas flow 8 from the shield-gas nozzle 97 (illustrated in FIG. 1) in the powder supply unit 3 onto the molten pool 142.

1.3.2 Control of Powder Supply

The procedure for controlling the amount of powder supplied to the processed region according to the first embodiment is explained below with reference to FIG. 4, which schematically illustrates the operations of the powder-supply control mechanism illustrated in FIGS. 2A to 2E.

Figure 4:
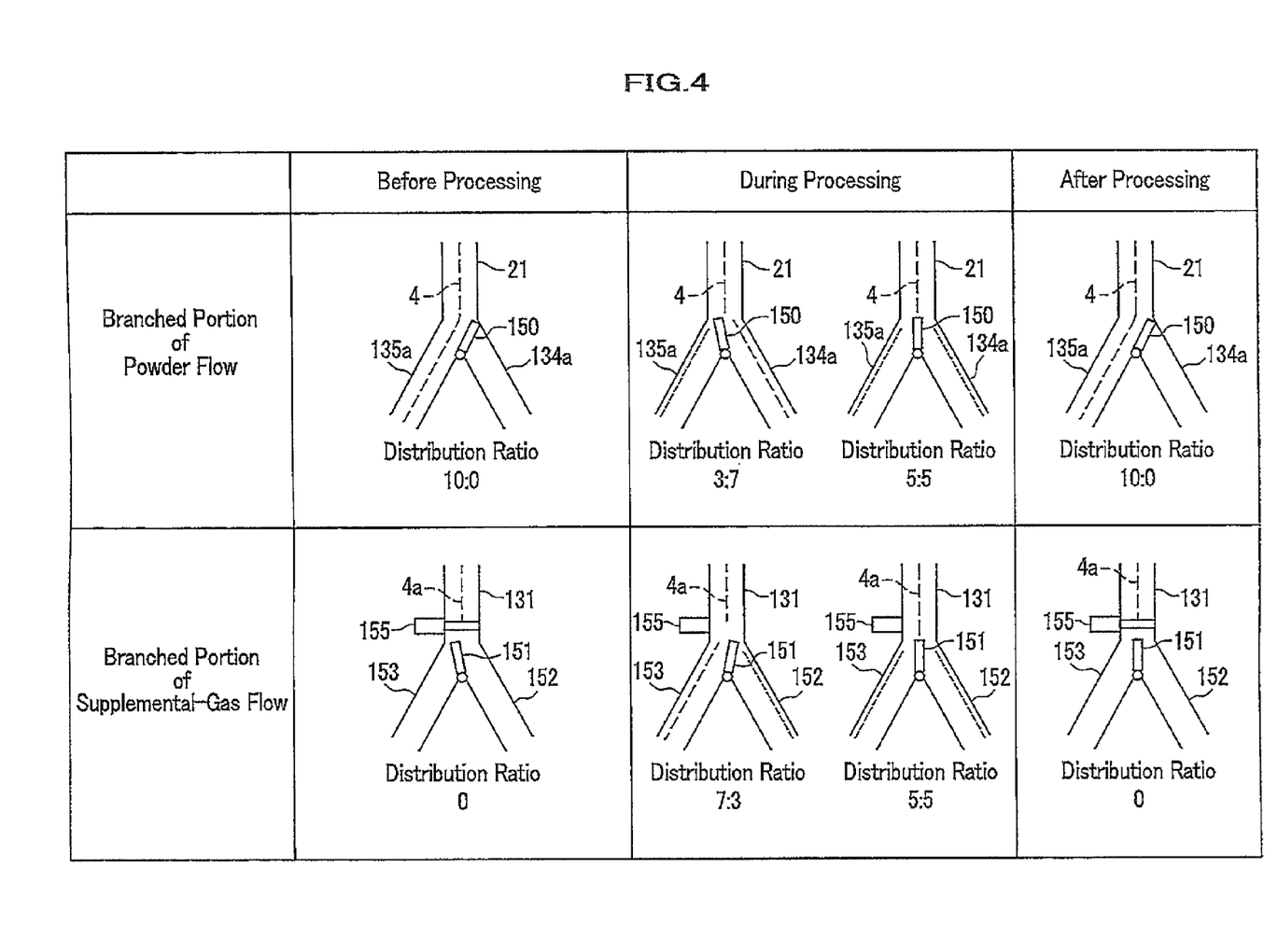
FIG. 4 is a diagram schematically illustrating operations of the powder-supply control mechanism illustrated in FIG. 2.

Before the processing (irradiation with the laser light) is started, as illustrated in the upper left field (a) in FIG. 4, a predetermined flow rate of the powder flow 4 is maintained in each of the powder supply channels 21, and the ratio between the openings of the branches 134a and 135a is set to 10:0 in the branch valve 150 in each of the powder-supply control mechanisms 130, so that all the powder flow supplied to each powder-supply control mechanism 130 through the corresponding one of the powder supply channels 21 flows through the branch 135a. At this time, each of the supplemental-gas supply channels 131 is closed by the shutoff valve 155 as illustrated in the lower left field (e). Thus, all the powder flow supplied to each powder-supply control mechanism 130 through the corresponding one of the powder supply channels 21 flows through one of the return pipe arrangements 135 (illustrated in FIGS. 1 and 3) to the powder recovery container 154, so that the powder supplied to the powder-supply control mechanisms 130 before the processing is started can be recovered and reused.

When the processing is started, and the turbine blade 140 as the workpiece is irradiated with the laser light 5 as illustrated in FIG. 3, the ratio between the openings in the branch valve 150 in each of the powder-supply control mechanisms 130 is adjusted so that the powder flow 4 is split into the branches 134a and 135a in a predetermined distribution ratio of 3:7 as illustrated in the upper middle field (b) in FIG. 4. At this time, the ratio between the openings of the branches 152 and 153 is adjusted to 7:3 in the branch valve 151 as illustrated in the lower middle field (f) in FIG. 4 according to the distribution ratio of 3:7 between the openings of the branches 134a and 135a in the branch valve 150, so that the flow rate of the carrier gas contained in the powder flow 4 can remain unchanged even after the distribution ratio between the branches 134a and 135a is changed as above. Thus, the part of the powder flow 4 distributed to the branch 134a is blown onto the molten pool 142 (illustrated in FIG. 3), i.e., the part of the powder flow 4 distributed to the branch 134a is used in production of the overlay weld 141.

When the distribution ratio between the branches 134a and 135a is required to be changed to 5:5 during the processing, the branch valve 150 can be controlled as illustrated in the upper middle field (c) in FIG. 4, and the ratio between the openings of the branches 152 and 153 is adjusted to 5:5 in the branch valve 151 as illustrated in the lower middle field (g) in FIG. 4 according to the distribution ratio of 5:5 between the openings of the branches 134a and 135a in the branch valve 150. Thus, the amount of the powder supplied to the molten pool 142 can be quickly adjusted with a very small time lag.

In order to control the amount of the powder supplied to the molten pool 142, the controller 9 controls the ratios between the openings of the branches in the branch valves 150 and 151 in accordance with a program in which the ratios between the openings are predetermined.

Although not shown, the amount of the powder supplied to the molten pool 142 is increased or decreased so as to change the shape of the overlay weld 141 according to the position on the workpiece 6. For example, the program of the controller 9 is arranged in advance to adjust the shape of the overlay weld by controlling the ratios between the openings in the branch valves 150 and 151, for example, in such a manner that the amount of the powder supplied to the molten pool 142 is increased immediately before the laser processing head moves to a position of the workpiece 6 on which the width or thickness of the overlay weld is required to be increased.

When the processing (the irradiation with the laser light 5) is terminated, the ratio between the openings of the branches 134a and 135a is set to 10:0 in the branch valve 150 in each of the powder-supply control mechanisms 130, so that all the powder flow supplied to each powder-supply control mechanism 130 through the corresponding one of the powder supply channels 21 flows through the branch 135a (as illustrated in the upper right field (d) in FIG. 4) to the powder recovery container 154. That is, the powder supplied to the powder-supply control mechanisms 130 after the processing is terminated can be recovered by the powder recovery container 154. At this time, each of the supplemental-gas supply channels 131 is closed by the shutoff valve 155 as illustrated in the lower right field (h).

1.4 Variations of First Embodiment (1) Although, in the first embodiment, the powder is recovered by connecting the branch 135a to the powder recovery container 154 through one of the return pipe arrangements 135, alternatively, the powder may be recovered by connecting the branch 135a to the powder supply device 2 (illustrated in FIG. 1).

(2) Although, in the first embodiment, it is assumed that only one type of powder is used, it is possible to produce overlay welds having various chemical compositions by supplying different types of powders through the respective powder supply channels 21 at respectively different flow rates.

1.5 Advantages of First Embodiment (1) According to the laser processing system and the overlay welding method according to the first embodiment, each of the powder-supply control mechanisms 130 distributes to the corresponding one of the powder supply nozzles (the powder discharge units) 111 at least a part of the powder flow supplied from the powder supply device 2. Therefore, the amount of the powder supplied to the processed region can be quickly controlled, so that the amount of the powder supplied to the processed region can be stabilized.

(2) According to the laser processing system and the overlay welding method according to the first embodiment, the powder which is not used in the processing (overlay welding) can be recovered during the processing. Therefore, the powder is not uselessly wasted, and the yield in the overlay welding can be increased.

2. Second Embodiment

The second embodiment of the present invention is explained below with reference to FIGS. 5 and 6.

2.1 Construction of Laser Processing System

Figure 5:
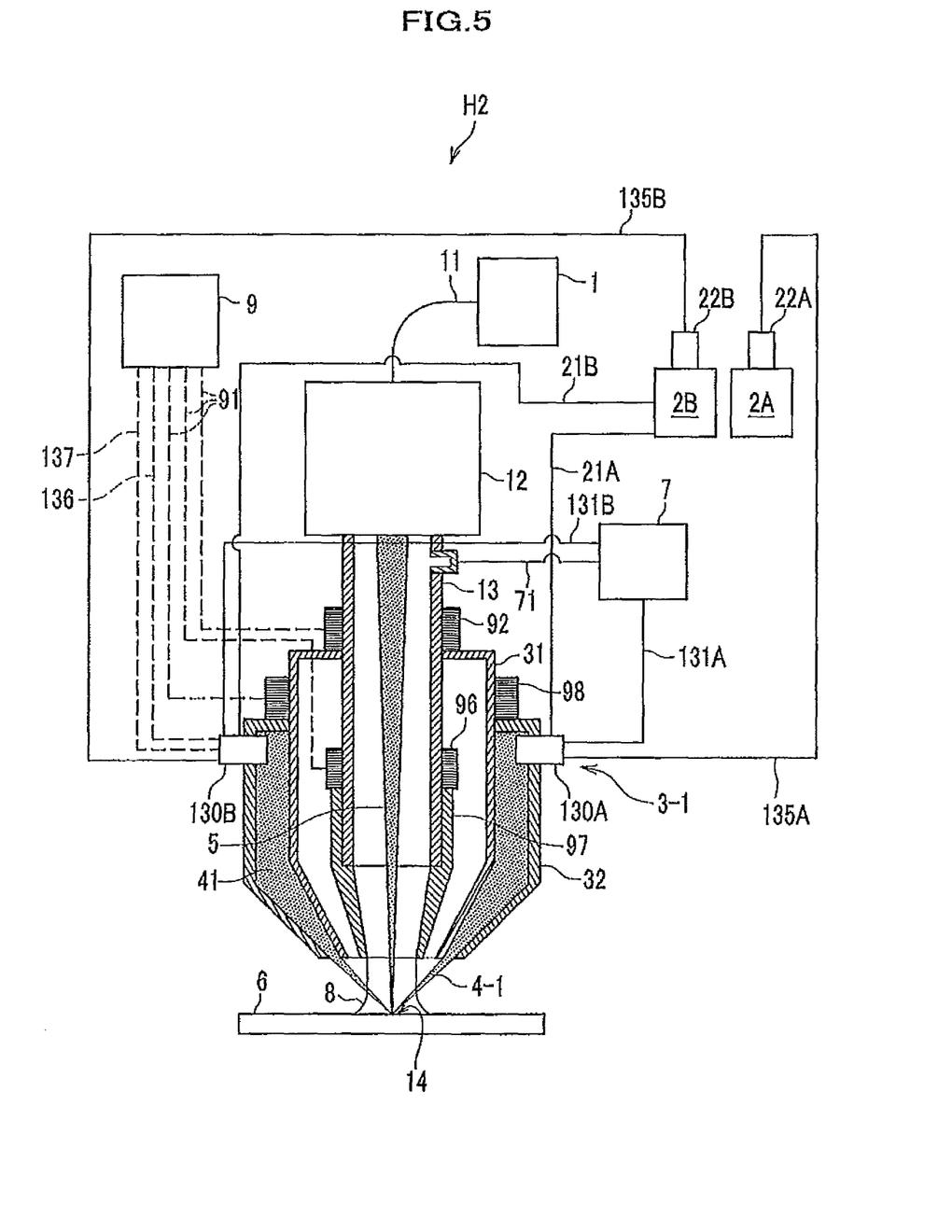
FIG. 5 is a schematic cross-sectional view of a laser processing system according to a second embodiment of the present invention.

FIG. 5 illustrates the laser processing system according to the second embodiment of the present invention. In FIG. 5, the elements equivalent to the corresponding elements in FIG. 1 respectively bear the same reference numbers as FIG. 1, and the explanations on the equivalent elements are not repeated. Specifically, in FIG. 5, the reference number 1 denotes the laser oscillator, 2A and 2B each denote a powder supply device, 3-1 denotes a powder supply unit, 4-1 denotes a powder flow, 5 denotes the laser light, 6 denotes the workpiece, 8 denotes the shield-gas flow, 9 denotes the controller, 11 denotes the optical fiber, 12 denotes the laser condensing unit, 13 denotes the laser emission unit, 21A and 21B each denote a powder supply channel, 22A and 22B each denotes a powder reservoir, 31 denotes an inner nozzle, 32 denotes an outer nozzle, 41 denotes a powder channel (powder discharge unit), 71 denotes the gas-supply tube, 91 denotes the signal lines, 92, 96, and 98 each denote a positioning mechanism, 130A and 130B each denote a powder-supply control mechanism, 131A and 131B each denote a supplemental-gas supply channel, and 135A and 135B each denote a return pipe arrangement.

In the laser processing system of FIG. 5, the laser light 5 is generated by the laser oscillator 1, transmitted through an optical fiber 11 to the laser condensing unit 12, condensed by the laser condensing unit 12, and emitted from the laser emission unit 13 onto the laser spot 14 on the workpiece 6.

The powder supply unit 3-1 is mainly constituted by the powder channel 41 and the powder-supply control mechanisms 130A and 130B. The powder channel 41 is realized as a space formed between the inner nozzle 31 and the outer nozzle 32.

The laser processing system according to the second embodiment includes a pair of powder supply devices 2A and 2B. The powders supplied from the powder supply devices 2A and 2B respectively flow through the powder supply channels 21A and 21B and the powder-supply control mechanisms 130A and 130B to the powder channel 41, join together in the powder channel 41, and are concentratedly supplied as a powder flow 4-1 to the laser spot 14 of the laser light 5 on the laser light 5.

Each of the powder-supply control mechanisms 130A and 130B distributes the powder flow supplied from the powder supply channel 21A or 21B to the powder-supply control mechanism, to the powder channel 41 and the return pipe arrangement 135A or 135B in a predetermined distribution ratio.

The return pipe arrangements 135A and 135B are respectively connected to the powder reservoirs 22A and 22B, which are respectively included in the powder supply devices 2A and 2B. Each of the powder reservoirs 22A and 22B recovers the corresponding type of powder from the powder flow received from the corresponding one of the return pipe arrangements 135A and 135B, and each of the powder supply devices 2A and 2B supplies the recovered powder again to the corresponding one of the powder-supply control mechanisms 130A and 130B. In the sense that the powder reservoirs 22A and 22B in the second embodiment recover the powders in a similar manner to the powder recovery container 154 in the first embodiment, the powder reservoirs 22A and 22B in the second embodiment corresponds to the powder recovery container 154 in the first embodiment.

The laser emission unit 13 is connected to the gas-supply tube 71, includes the shield-gas nozzle 97, and is arranged to be able to blow the shield-gas flow 8 from the shield-gas nozzle 97 onto the workpiece 6.

The shield-gas nozzle 97 has the positioning mechanism 96, which can be realized, for example, by using an electric actuator or the like. The positioning mechanism 96 enables adjustment of the position of the tip of the shield-gas nozzle 97 in the vertical direction, i.e., control of the (standoff) distance of the shield-gas nozzle 97. The operation of the positioning mechanism 96 is controlled by the controller 9 through the signal lines 91.

The inner nozzle 31 is arranged around the outer surface of the laser emission unit 13 in such a manner that the center axis of the inner nozzle 31 coincides with the optical axis of the laser light. The inner nozzle 31 has a near-tip portion having an outer shape of a truncated cone, where the diameter of the near-tip portion of the inner nozzle 31 decreases with decrease in the distance from the tip of the inner nozzle 31. In addition, the outer nozzle 32 is arranged around the outer surface of the inner nozzle 31 in such a manner that the center axis of the outer nozzle 32 coincides with the optical axis of the laser light. The outer nozzle 32 has a near-tip portion having an outer shape of a truncated cone, where the diameter of the near-tip portion of the outer nozzle 32 decreases with decrease in the distance from the tip of the outer nozzle 32.

As mentioned before, the powder channel 41 is formed between the inner nozzle 31 and the outer nozzle 32. The diameters of the inner nozzle 31 and the outer nozzle 32 decrease with decrease in the distance from the tips of the inner nozzle 31 and the outer nozzle 32 in such a manner that the cross-sectional area of the powder channel 41 decreases with decrease in the distance from the tips, and the powder flow 4-1 is concentrated at a predetermined position on the optical axis of the laser light. Therefore, the velocity of the powder in the powder flow 4-1 is increased as the powder in the flow approaches the tips of the inner nozzle 31 and the outer nozzle 32.

The positioning mechanism 92 is arranged around the outer surface of the laser emission unit 13 above the inner nozzle 31 in order to adjust the position of the inner nozzle 31 in the vertical direction (i.e., in the direction of the optical axis of the laser light). When the inner nozzle 31 moves in the vertical direction, both of the inner nozzle 31 and the outer nozzle 32 move in the vertical direction. Therefore, the position at which the powder flow 4-1 discharged from the tip of the powder channel 41 is concentrated can be controlled by the vertical movement of the inner nozzle 31 realized by the positioning mechanism 92. The operations of the positioning mechanism 92 are controlled by the controller 9 through the signal lines 91.

The positioning mechanism 98 is arranged around the outer surface of the inner nozzle 31 above the outer nozzle 32 in order to adjust the position of the outer nozzle 32 in the vertical direction (i.e., in the direction of the optical axis of the laser light). In the case where the tip of the outer nozzle 32 is located below the tip of the inner nozzle 31, the blowing angle of the powder flow 4-1 which is blown out of the powder channel 41 can be controlled by changing the relative position between the tips (the bottom edges) of the inner nozzle 31 and the outer nozzle 32. Resultantly, the position at which the powder flow 4-1 discharged from the tip of the powder channel 41 is concentrated can also be controlled by the vertical movement of the outer nozzle 32 realized by the positioning mechanism 98. The operations of the positioning mechanism 98 are controlled by the controller 9 through the signal lines 91.

2.2 Operations

Next, the operations and advantages of the laser processing system according to the second embodiment are explained below.

Figure 6:
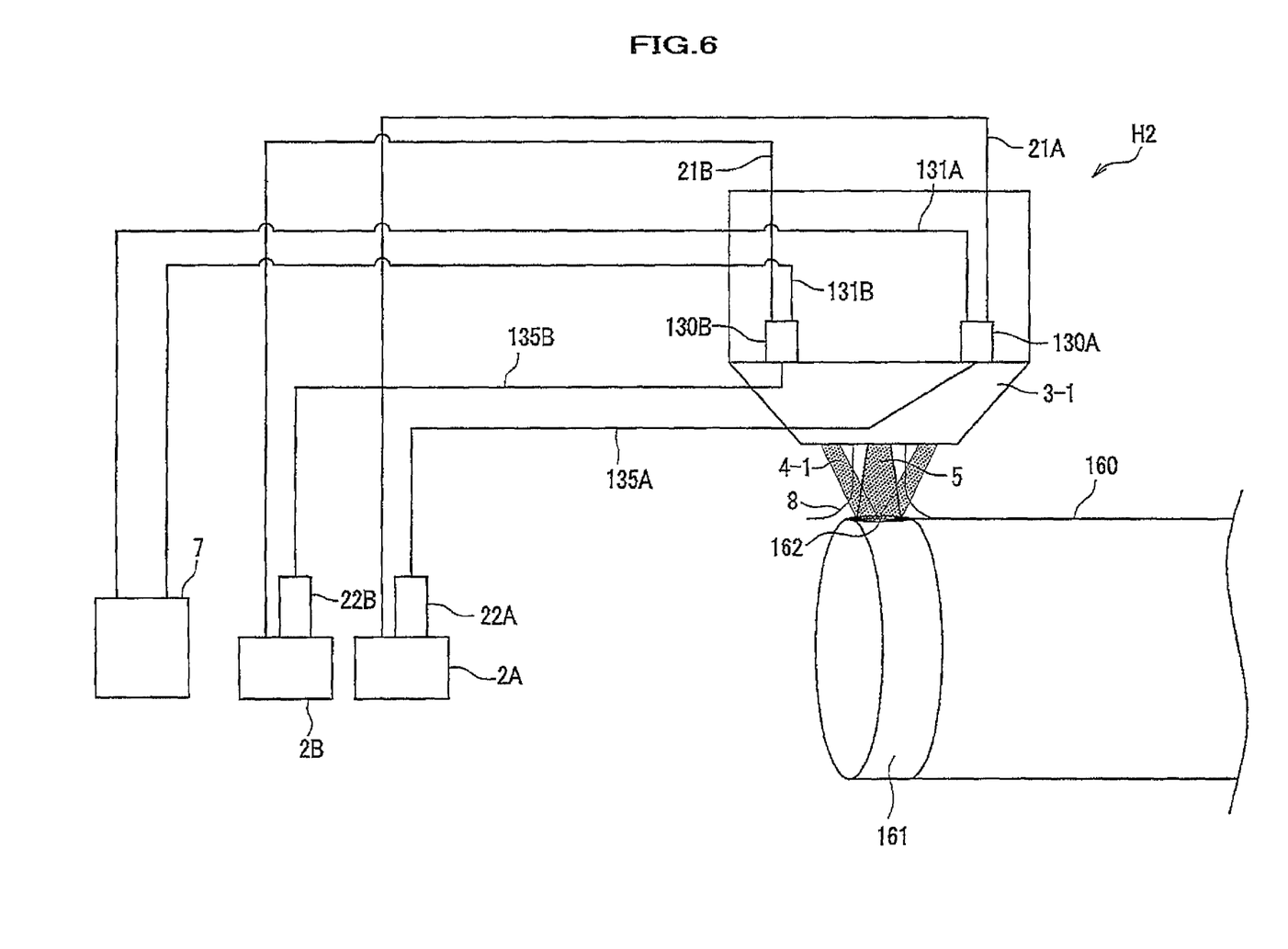
FIG. 6 is a diagram schematically illustrating an example of a configuration for overlay welding by use of the laser processing system illustrated in FIG. 5.

FIG. 6 schematically illustrates an example of a configuration for overlay welding by use of the laser processing system illustrated in FIG. 5. In the example of FIG. 6, the laser processing system according to the present embodiment is used in overlay welding on a rotor shaft 180 as a workpiece, where the overlay welding is performed for making the rotor shaft wear resistant. In FIG. 6, the same elements as FIG. 5 respectively bear the same reference numbers.

As illustrated in FIG. 6, an overlay weld 161 is formed by supplying a powder flow 4-1 from the powder supply unit 3-1 to a molten pool 162 (which is produced by irradiation with the laser light 5) while rotating the turbine rotor shaft 160. Oxidation of the overlay weld 161 is suppressed by blowing a shield-gas flow 8 from the shield-gas nozzle 97 (illustrated in FIG. 5) in the powder supply unit 3-1 onto the molten pool 162.

In the laser processing system according to the second embodiment, the powder supply device 2A supplies powder A to the powder-supply control mechanism 130A through the powder supply channel 21A, and the powder supply device 2B supplies powder B to the powder-supply control mechanism 130B through the powder supply channel 21B. The powder-supply control mechanism 130A distributes a powder flow containing a predetermined part (corresponding to a predetermined distribution ratio) of the powder A to the powder channel 41, and the powder-supply control mechanism 130B distributes a powder flow containing a predetermined part (corresponding to a predetermined distribution ratio) of the powder B to the powder channel 41. Then, the powder flows being distributed to the powder channel 41 and respectively containing the powders A and B join together in the powder channel 41 to form the powder flow 4-1, and the powder flow 4-1 is supplied to the laser spot 14 of the laser light 5 on the workpiece 6 in such a manner that the powder flow 4-1 is concentrated at the laser spot 14.

In the example of FIG. 6, the overlay welds which are respectively produced from the powders A and B are assumed to exhibit different degrees of hardness. Specifically, the powder A is assumed to produce a weld exhibiting higher hardness than the base material of the turbine rotor shaft 160, and the powder B is assumed to produce a weld exhibiting higher hardness than the weld produced from the powder A.

In the example of the process of forming the overlay welding illustrated in FIG. 6 by using the laser processing system according to the second embodiment, the mixing ratio of the powders A and B is controlled so that the near-surface portion of the overlay weld 161 becomes the hardest. That is, in the example of FIG. 6, a composition-graded overlay is produced by controlling the chemical composition in the overlay weld 161.

In the example of the process of forming the overlay welding illustrated in FIG. 6, the powders A and B are supplied from the powder supply devices 2A and 2B to the powder-supply control mechanisms 130A and 130B as follows.

Before the processing (irradiation with the laser light) is started, a flow containing each of the powders A and B is supplied at a predetermined flow rate to the corresponding one of the powder-supply control mechanisms 130A and 130B, and the powder-supply control mechanisms 130A and 130B are controlled in such a manner that all the powder flow containing the powder A is distributed to the return pipe arrangement 135A, and all the powder flow containing the powder B is distributed to the return pipe arrangement 135B. Thus, all the powders supplied to the powder-supply control mechanisms 130A and 130B before the processing is started can be recovered by the powder reservoirs 22A and 22B for reuse.

At this time, the supplemental-gas supply channels 131A and 131B illustrated in FIGS. 5 and 6 (through which the supplemental gas can be supplied to the powder-supply control mechanisms 130A and 130B similarly to the supplemental-gas supply channels 131 in the first embodiment) are each closed as illustrated in FIG. 2E by a shutoff valve which is configured similarly to the shutoff valve 155 in the first embodiment. Therefore, the supplemental gas is not supplied to the powder-supply control mechanisms 130A and 130B before the processing is started.

Table 1 indicates the mixing ratio of the powders A and B for use in formation of each layer in the overlay welding in the example of FIG. 6.

TABLE 1

| Layer | Powder Mixing Ratio (A:B) |
|---|---|
| 1st | 10:0 |
| 2nd | 8:2 |
| 3rd | 6:4 |
| 4th | 2:8 |
| 5th | 0:10 |

As indicated in Table 1, during overlay welding of the first layer, only the powder A is supplied to the laser spot 14 of the laser light 5 on the workpiece 6. As mentioned before, the hardness of the weld produced from the powder A is nearer to the hardness of the base material of the turbine rotor shaft 160 than the hardness of the weld produced from the powder B. Specifically, during the overlay welding of the first layer, the powder-supply control mechanism 130A is controlled so that all the powder A supplied from the powder reservoir 22A to the powder-supply control mechanism 130A is distributed to the powder channel 41.

In addition, during the overlay welding of the first layer, the powder-supply control mechanism 130B is controlled so that all the powder B supplied from the powder reservoir 22B to the powder-supply control mechanism 130B is distributed through the return pipe arrangement 135B to the powder reservoir 22B for recovery by the powder reservoir 22B. At this time, the aforementioned supplemental-gas supply channels 131A and 131B are each closed by the aforementioned shutoff valve as before the start of the processing. Therefore, the supplemental gas is not supplied to the powder-supply control mechanisms 130A and 130B during the overlay welding of the first layer.

As indicated in Table 1, during overlay welding of the second layer, the powder-supply control mechanisms 130A and 130B are controlled to achieve the mixing ratio 8:2 of the powders A and B without changing the total flow rate of the powders A and B supplied to the from the powder supply devices 2A and 2B to the powder-supply control mechanisms 130A and 130B.

During the overlay welding of the second layer, the gas source 7 supplies the supplemental gas to the powder-supply control mechanisms 130A and 130B through the supplemental-gas supply channels 131A and 131B, and the aforementioned branch valves provided in the powder-supply control mechanisms 130A and 130B (and configured similarly to the branch valve 151 in the first embodiment) supplement the powder flows with the supplemental gas in such a manner that the flow rate of the carrier gas contained in each powder flow supplied to the processed region is unchanged by the change of the distribution ratio in the corresponding shutoff valve.

Subsequently, the other layers are produced by operations similar to the first and second layers except that the branch valves and the shutoff valves in the powder-supply control mechanisms 130A and 130B are controlled to achieve the mixing ratio indicated in Table 1 for each layer while maintaining the flow rate of the carrier gas contained in each powder flow supplied to the processed region.

Since the composition-graded overlay welding is performed in the above example, the overlay weld 161 is superior in adhesion to the surface of the turbine rotor shaft 160 and adhesion between the layers constituting the overlay weld 161. In addition, since the outermost (fifth) layer of the overlay weld 161 has the composition produced from only the powder B, the outermost layer of the turbine rotor shaft 160 becomes the hardest.

2.3 Advantages of Second Embodiment (1) According to the laser processing system and the overlay welding method according to the second embodiment, each of the powder-supply control mechanisms 130A and 130B distributes to the powder channel (the powder discharge unit) 41 at least a part of the powder flow supplied from the corresponding one of the powder supply devices 2A and 2B. Therefore, the amounts of the powders supplied to the processed region can be quickly controlled, so that the amounts of the powders supplied to the processed region can be stabilized.

(2) According to the laser processing system and the overlay welding method according to the second embodiment, multiple types of powders (e.g., A and B) can be supplied to the powder channel (the powder discharge unit) 41. Therefore, overlay welds having various compositions can be produced by individually varying the supplied amounts of the multiple types of powders.

(3) According to the laser processing system and the overlay welding method according to the second embodiment, it is possible to produce overlay welds containing layers having different compositions by varying the supplied amounts of the powders continuously or successively. Further, since the supplied amounts of the powders can be quickly controlled, it is possible to easily control the chemical composition of the overlay weld on a layer-by-layer basis.

(4) According to the laser processing system and the overlay welding method according to the second embodiment, the powders (e.g., A and B) which are not used in the processing (overlay welding) can be recovered during the processing. Therefore, the powders are not uselessly wasted, and the yield in the overlay welding can be increased.

3. Third Embodiment

The third embodiment of the present invention is explained below with reference to FIG. 7.

3.1 Construction of Laser Processing System

Figure 7:
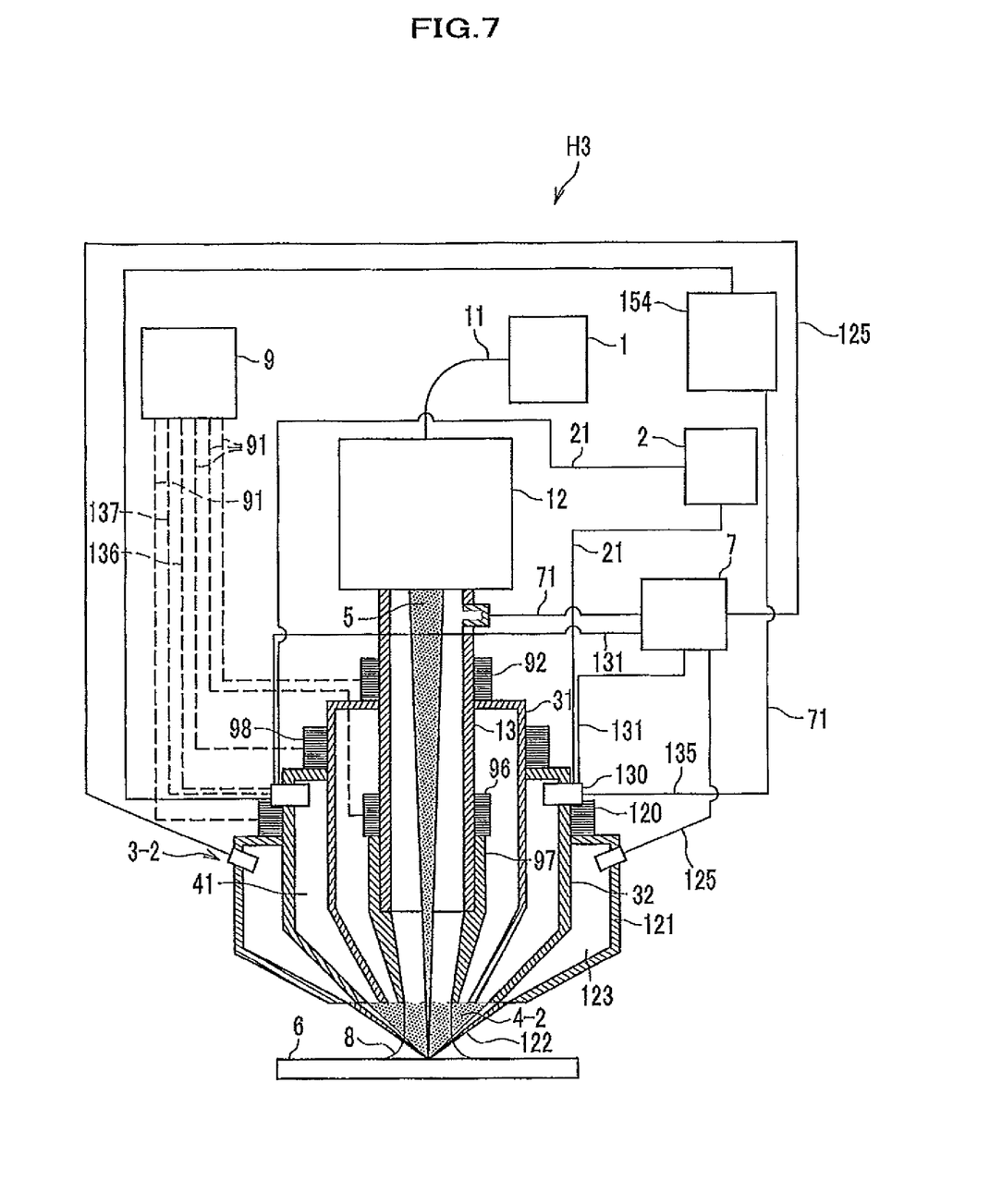
FIG. 7 is a schematic cross-sectional view of a laser processing system according to a third embodiment of the present invention.

FIG. 7 illustrates the laser processing system according to the third embodiment of the present invention. In FIG. 7, the elements equivalent to the corresponding elements in FIGS. 1 and 5 respectively bear the same reference numbers as FIGS. 1 and 5, and the explanations on the equivalent elements are not repeated. Specifically, in FIG. 7, the reference number 1 denotes the laser oscillator, 2 denotes the powder supply device, 3-2 denotes a powder supply unit, 4-2 denotes a powder flow, 5 denotes the laser light, 6 denotes the workpiece, 8 denotes the shield-gas flow, 9 denotes the controller, 11 denotes the optical fiber, 12 denotes the laser condensing unit, 13 denotes the laser emission unit, 21 denotes the powder supply channels, 31 denotes the inner nozzle, 32 denotes the outer nozzle, 41 denotes the powder channel (powder discharge unit), 71 denotes the gas-supply tube, 91 denotes the signal lines, 92, 96, 98, and 120 each denote a positioning mechanism, 121 denotes a gas nozzle, 122 denotes a guide gas flow, 123 denotes a gas channel, 125 denotes a gas supply tube, 130 denotes the powder-supply control mechanisms, 131 denotes the supplemental-gas supply channels, 135 denotes the return pipe arrangements, and 154 denotes the powder recovery container.

As illustrated in FIG. 7, in the laser processing system according to the third embodiment, the gas nozzle 121 is further arranged around the outer surface of the outer nozzle 32 in such a manner that inert gas can be introduced into the gap between the outer nozzle 32 and the gas nozzle 121 from the gas source 7 through the gas supply tube 125. The above inert gas is blown out from the tip of the gas nozzle 121, and forms the guide gas flow 122.

Specifically, the gas nozzle 121 has a near-tip portion having an outer shape of a truncated cone, where the diameter of the near-tip portion of the gas nozzle 121 decreases with decrease in the distance from the tip of the gas nozzle 121. In addition, the center axis of the gas nozzle 121 coincides with the optical axis of the laser light.

In addition, the gas channel 123 is formed between the outer nozzle 32 and the gas nozzle 121. The diameters of the outer nozzle 32 and the gas nozzle 121 decrease with decrease in the distance from the tips of the outer nozzle 32 and the gas nozzle 121 in such a manner that the cross-sectional area of the gas channel 123 decreases with decrease in the distance from the tips, and the guide gas flow 122 is focused on a predetermined position on the optical axis of the laser light. Therefore, the velocity of the inert gas in the guide gas flow 122 is increased as the inert gas in the guide gas flow 122 approaches the tips of the outer nozzle 32 and the gas nozzle 121. Since the guide gas flow 122 exists outside the powder flow 4-2 and is focused on the predetermined position on the optical axis of the laser light, the guide gas flow 122 guides the powder flow 4-2 and facilitates concentration of the powder flow 4-2 at a predetermined position on the optical axis of the laser light.

In addition, the positioning mechanism 120 is arranged around the outer surface of the outer nozzle 32 above the gas nozzle 121 in order to adjust the position of the gas nozzle 121 in the vertical direction (i.e., in the direction of the optical axis of the laser light). In the case where the tip of the gas nozzle 121 is located below the tip of the outer nozzle 32, the blowing angle of the guide gas flow 122 which is blown out of the gas channel 123 can be controlled by changing the relative position between the tips (the bottom edges) of the outer nozzle 32 and the gas nozzle 121. Resultantly, the position on which the guide gas flow 122 discharged from the tip of the gas channel 123 is focused can also be controlled by the vertical movement of the gas nozzle 121 realized by the positioning mechanism 120. The operations of the positioning mechanism 120 are controlled by the controller 9 through the signal lines 91.

3.2 Advantages of Third Embodiment (1) According to the laser processing system and the overlay welding method according to the third embodiment, each of the powder-supply control mechanisms 130 distributes to the powder channel (the powder discharge unit) 41 at least a part of the powder flow supplied from the powder supply device 2. Therefore, the amount of the powder supplied to the processed region can be quickly controlled, so that the amount of the powder supplied to the processed region can be stabilized.

(2) According to the laser processing system and the overlay welding method according to the third embodiment, the powder which is not used in the processing (overlay welding) can be recovered during the processing. Therefore, the powder is not uselessly wasted, and the yield in the overlay welding can be increased.

(3) According to the laser processing system and the overlay welding method according to the third embodiment, the guide gas flow facilitates concentration of the powder flow at a predetermined position on the optical axis of the laser light. Therefore, it is possible to precisely produce an overlay weld on a region to be processed.

What is claimed is:

1. A laser processing system comprising:
a laser processing head including,
a laser emission unit which irradiates a workpiece with laser light,
a powder supply unit which receives powder supplied from a powder supply device to the laser processing head, can supply the powder to a laser spot on the workpiece, and includes,
a powder discharge unit which can discharge the powder toward the laser spot on the workpiece, and
a powder-supply control mechanism which controls the amount of the powder to be supplied to the powder discharge unit, by distributing to the powder discharge unit at least a part of a flow of the powder supplied from the powder supply device;
the powder supply device which supplies the powder to the laser processing head;
a controller which controls the distributing by the powder-supply control mechanism; and
a powder recovery container, wherein the powder-supply control mechanism includes,
a plurality of branches arranged on a downstream side of a powder supply channel through which the powder is supplied from the powder supply device to the powder-supply control mechanism,
a supply pipe arrangement which connects at least one of the plurality of branches to the powder discharge unit,
a return pipe arrangement which connects one or more of the plurality of branches other than the at least one of the plurality of branches to the powder recovery container, and
a distribution-ratio control mechanism which controls a distribution ratio between the plurality of branches.

2. The laser processing system according to claim 1, wherein the powder-supply control mechanism includes a supplemental-gas supply mechanism which can supply supplemental gas to the plurality of branches.

3. A laser processing system comprising:
a laser processing head including,
an laser emission unit which irradiates a workpiece with laser light,
a powder supply unit which receives powder supplied from a powder supply device to the laser processing head, can supply the powder to a laser spot on the workpiece, and includes,
a powder discharge unit which can discharge the powder toward the laser spot on the workpiece, and
a powder-supply control mechanism which controls the amount of the powder to be supplied to the powder discharge unit, by distributing to the powder discharge unit at least a part of a flow of the powder supplied from the powder supply device;
the powder supply device which supplies the powder to the laser processing head; and
a controller which controls the distributing by the powder-supply control mechanism,
wherein the powder supply device includes a powder reservoir, and the powder-supply control mechanism includes,
a plurality of branches arranged on a downstream side of a powder supply channel through which the powder is supplied from the powder supply device to the powder-supply control mechanism,
a supply pipe arrangement which connects at least one of the plurality of branches to the powder discharge unit,
a return pipe arrangement which connects one or more of the plurality of branches other than the at least one of the plurality of branches to the powder reservoir, and
a distribution-ratio control mechanism which controls a distribution ratio between the plurality of branches.

4. The laser processing system according to claim 3, wherein the powder-supply control mechanism includes a supplemental-gas supply mechanism which can supply supplemental gas to the plurality of branches.

5. A laser processing system comprising:
a laser processing head including,
a laser emission unit which irradiates a workpiece with laser light, and
a powder supply unit which receives a plurality of types of powders respectively supplied from a plurality of powder supply devices to the laser processing head, can supply the plurality of types of powders to a laser spot on the workpiece, and includes,
a powder discharge unit which can discharge the plurality of types of powders toward the laser spot on the workpiece, and
a plurality of powder-supply control mechanisms which respectively control the amounts of the plurality of types of powders to the powder discharge unit, by distributing to the powder discharge unit at least a part of a flow of each of the plurality of types of powders supplied from the plurality of powder supply devices;
the plurality of powder supply devices which supply the plurality of types of powders to the laser processing head;
a controller which controls the distributing by the plurality of powder-supply control mechanisms; and a plurality of powder recovery containers, wherein each of the plurality of powder-supply control mechanisms includes,
a plurality of branches arranged on a downstream side of a powder supply channel through which one of the plurality of types of powders is supplied from one of the plurality of powder supply devices,
a supply pipe arrangement which connects at least one of the plurality of branches to the powder discharge unit,
a return pipe arrangement which connects one or more of the plurality of branches other than the at least one of the plurality of branches to one of the plurality of powder recovery containers, and
a distribution-ratio control mechanism which controls a distribution ratio between the plurality of branches.

6. The laser processing system according to claim 5, wherein each of the plurality of powder-supply control mechanisms includes a supplemental-gas supply mechanism which can supply supplemental gas to the plurality of branches.

7. A laser processing system comprising:
a laser processing head including,
a laser emission unit which irradiates a workpiece with laser light, and
a powder supply unit which receives a plurality of types of powders respectively supplied from a plurality of powder supply devices to the laser processing head, can supply the plurality of types of powders to a laser spot on the workpiece, and includes,
a powder discharge unit which can discharge the plurality of types of powders toward the laser spot on the workpiece, and
a plurality of powder-supply control mechanisms which respectively control the amounts of the plurality of types of powders to the powder discharge unit, by distributing to the powder discharge unit at least a part of a flow of each of the plurality of types of powders supplied from the plurality of powder supply devices;
the plurality of powder supply devices which supply the plurality of types of powders to the laser processing head; and
a controller which controls the distributing by the plurality of powder-supply control mechanisms,
wherein the plurality of powder supply devices respectively include a plurality of powder reservoirs, and each of the plurality of powder-supply control mechanisms includes,
a plurality of branches arranged on a downstream side of a powder supply channel through which one of the plurality of types of powders is supplied from one of the plurality of powder supply devices,
a supply pipe arrangement which connects at least one of the plurality of branches to the powder discharge unit,
a return pipe arrangement which connects one or more of the plurality of branches other than the at least one of the plurality of branches to one of the plurality of powder reservoirs including the one of the plurality of types of powders, and
a distribution-ratio control mechanism which controls a distribution ratio between the plurality of branches.

8. The laser processing system according to claim 7, wherein each of the plurality of powder-supply control mechanisms includes a supplemental-gas supply mechanism which can supply supplemental gas to the plurality of branches.

9. An overlay welding method executed in a laser processing system including a laser processing head and a plurality of powder supply devices which respectively supply a plurality of types of powders to the laser processing head, where the laser processing head includes a laser emission unit which irradiates a workpiece with laser light and a powder discharge unit which can discharge the plurality of types of powders to a laser spot on the workpiece, the overlay welding method comprising the steps of:

supplying the plurality of types of powders from the plurality of powder supply devices to a plurality of powder-supply control mechanisms arranged in the laser processing head, respectively;

controlling, by the plurality of powder-supply control mechanisms, the amounts of the plurality of types of powders to be supplied to the powder discharge unit, by distributing to the powder discharge unit at least a part of a flow of each of the plurality of types of powders supplied from the plurality of powder supply devices, respectively; and discharging, by the powder discharge unit, the plurality of types of powders the amounts of which are controlled by the plurality of powder-supply control mechanisms, to the laser spot on the workpiece, wherein in the controlling by each of the plurality of powder-supply control mechanisms, the flow of one of the plurality of types of powders supplied from the powder supply device to one of the plurality of powder-supply control mechanisms is split, at a position on a downstream side of a powder supply channel through which the one of the plurality of types of powders is supplied from one of the plurality of powder supply devices, into a first part which is to be distributed to the powder discharge unit and a second part which is to be distributed to a powder reservoir arranged in the one of the plurality of powder supply devices, and the amount of the one of the plurality of types of powders to be supplied to the powder discharge unit is controlled by controlling a distribution ratio between the first part and the second part.

10. The overlay welding method according to claim 9, wherein the one of the plurality of types of powders is sent out, together with carrier gas, from the one of the plurality of powder supply devices to the powder supply channel.

11. The overlay welding method according to claim 10, wherein supplemental gas is added to the first part before distributing the one of the plurality of types of powders to the powder discharge unit.

12. An overlay welding method executed in a laser processing system including a laser processing head and a plurality of powder supply devices which respectively supply a plurality of types of powders to the laser processing head, where the laser processing head includes a laser emission unit which irradiates a workpiece with laser light and a powder discharge unit which can discharge the plurality of types of powders to a laser spot on the workpiece, the overlay welding method comprising the steps of:

supplying the plurality of types of powders from the plurality of powder supply devices to a plurality of powder-supply control mechanisms arranged in the laser processing head, respectively;

controlling, by the plurality of powder-supply control mechanisms, the amounts of the plurality of types of powders to be supplied to the powder discharge unit, by distributing to the powder discharge unit at least a part of a flow of each of the plurality of types of powders supplied from the plurality of powder supply devices, respectively; and discharging, by the powder discharge unit, the plurality of types of powders the amounts of which are controlled by the plurality of powder-supply control mechanisms, to the laser spot on the workpiece, wherein one of the plurality of types of powders is sent out, together with carrier gas, from one of the plurality of powder supply devices to the powder supply channel.

13. The overlay welding method according to claim 12, wherein supplemental gas is added to a first part before distributing the one of the plurality of types of powders to the powder discharge unit.

* * * * *